(12) United States Patent
Cheal et al.

(10) Patent No.: US 6,886,855 B2
(45) Date of Patent: May 3, 2005

(54) GAS GENERANT FILTER ASSEMBLIES

(75) Inventors: Blake L. Cheal, Perry, UT (US); John D. Kemp, Murray, UT (US); Steve Hammer, North Ogden, UT (US)

(73) Assignee: Autoliv ASP, Inc., Ogden, UT (US)

( * ) Notice: Subject to any disclaimer, the term of this patent is extended or adjusted under 35 U.S.C. 154(b) by 346 days.

(21) Appl. No.: 10/159,549

(22) Filed: May 31, 2002

(65) Prior Publication Data

US 2003/0222443 A1 Dec. 4, 2003

(51) Int. Cl.$^7$ .......................... B60R 21/28; B60R 21/26
(52) U.S. Cl. ....................................... 280/741; 280/736
(58) Field of Search ................................. 280/741, 736

(56) References Cited

U.S. PATENT DOCUMENTS

| | | | | |
|---|---|---|---|---|
| 4,530,516 A | * | 7/1985 | Adams et al. .............. | 280/741 |
| 4,865,635 A | | 9/1989 | Cuevas | |
| 4,907,819 A | * | 3/1990 | Cuevas ....................... | 280/736 |
| 4,923,212 A | * | 5/1990 | Cuevas ....................... | 280/736 |
| 5,062,367 A | * | 11/1991 | Hayashi et al. ............. | 102/530 |
| 5,100,171 A | * | 3/1992 | Faigle et al. ................. | 280/741 |
| 5,204,068 A | * | 4/1993 | O'Loughlin et al. ........ | 422/180 |
| 5,268,013 A | * | 12/1993 | Bruncher et al. ............. | 55/486 |
| 5,556,130 A | * | 9/1996 | Fulmer ....................... | 280/741 |
| 5,584,506 A | * | 12/1996 | Van Wynsberghe ......... | 280/741 |
| 5,625,164 A | | 4/1997 | McFarland et al. | |
| 5,645,296 A | * | 7/1997 | Okada et al. ................ | 280/736 |
| 5,829,785 A | | 11/1998 | Jordan et al. | |
| 6,123,359 A | * | 9/2000 | Cabrera et al. ............. | 280/741 |
| 6,183,006 B1 | * | 2/2001 | Katsuda et al. ............. | 280/736 |
| 6,189,927 B1 | | 2/2001 | Mossi et al. | |
| 6,276,717 B1 | | 8/2001 | Katsuda et al. | |
| 6,527,297 B1 | * | 3/2003 | Parkinson et al. .......... | 280/741 |

FOREIGN PATENT DOCUMENTS

EP        1 151 899 A1      7/2001

* cited by examiner

Primary Examiner—Charles T. Jordan
Assistant Examiner—Bret Hayes
(74) Attorney, Agent, or Firm—James D. Erickson; Sally J. Brown

(57) ABSTRACT

Gas generant filter assemblies and related combinations, including airbag inflator devices, are provided which assemblies include a tubular wall portion with a sleeve member and a central opening adapted to at least in part contain a supply of gas generant material reactable to produce reaction products including a quantity of gas. The assemblies also include a closure such as disposed within the central opening at the second end of the central opening. The sleeve member is shapeable to form a plurality of retention tabs effective to secure the closure within the central opening at the second end.

36 Claims, 6 Drawing Sheets

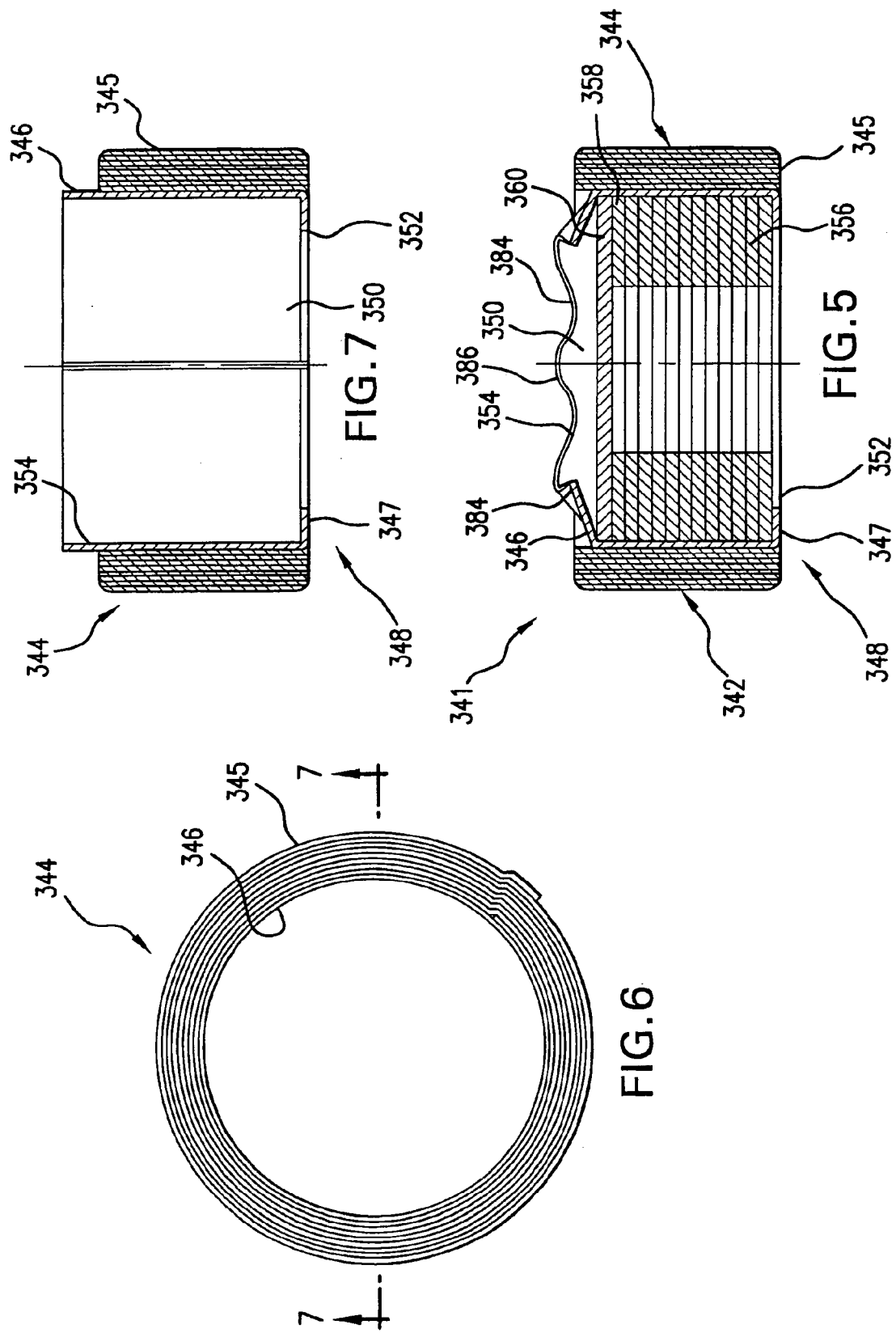

GAS GENERANT FILTER ASSEMBLIES

BACKGROUND OF THE INVENTION

This invention relates generally to inflatable restraint systems and, more particularly, to filter assemblies and related combinations used in or in association with the generation of gas via the reaction of a solid form of gas generant material.

It is well known to protect a vehicle occupant using a cushion or bag, e.g., an "airbag cushion," that is inflated or expanded with gas when the vehicle encounters sudden deceleration, such as in the event of a collision. In such systems, the airbag cushion is normally housed in an uninflated and folded condition to minimize space requirements. Such systems typically also include one or more crash sensors mounted on or to the frame or body of the vehicle to detect sudden decelerations of the vehicle and to electronically trigger activation of the system. Upon actuation of the system, the cushion begins to be inflated in a matter of no more than a few milliseconds with gas produced or supplied by a device commonly referred to as an "inflator."

Many types of inflator devices have been disclosed in the art for the inflating of one or more inflatable restraint system airbag cushions. Inflator devices which form or produce inflation gas via the combustion of a gas generating material, i.e., a "gas generant," such as in the form of a pyrotechnic material, are well known. It is also known that certain of such inflator devices may use such generated gas to supplement stored and pressurized gas by the addition of high temperature combustion products, including additional gas products, produced by the burning of the gas generating material to a supply of the stored, pressurized gas. In some cases, the combustion products produced by the burning of a gas generating material may be the sole or substantially the sole source for the inflation gas issuing forth from a particular inflator device.

It is common that inflator devices include an initiator, such as a squib, and an igniter. In practice, upon receipt of an appropriate triggering signal from a crash or other selected deceleration sensor, the initiator activates causing the rapid combustion of the igniter material, which, in turn, ignites the gas generant. The burning of the pyrotechnic (gas generating) and initiation materials, however, almost invariably results in the undesired production of particulate material. In view thereof, various approaches have been attempted and/or suggested to filter or otherwise remove particulate matter from such produced gas.

In addition to filter devices of varying complexity, typical inflator assemblies devices require the inclusion of additional hardware or component parts such as a retainer disk or, as sometimes referred to, a retainer lid, for example, to permit or allow for proper and desired containment of the gas generant material within the inflator assembly. As will be appreciated, the presence and inclusion within an inflator device of additional hardware or component parts for each of the purposes of filtration and gas generant containment typically undesirably complicates one or more of the design, assembly, and operation of the resulting inflator device. Consequently, one or more of the cost, weight and complexity of a particular inflator assembly may be greater than otherwise desired.

In view of the above, there is a need and demand for a gas generant filter assembly and related combinations which desirably avoid or minimize the requirement for additional component parts and/or otherwise reduce or minimize one or more of the cost, weight and complexity of assembly, preferably without detrimentally impacting either or both performance and operation.

SUMMARY OF THE INVENTION

A general object of the invention is to provide an improved gas generant filter assembly and related combinations, including airbag inflator devices.

A more specific objective of the invention is to overcome one or more of the problems described above.

The general object of the invention can be attained, at least in part, through a specified gas generant filter assembly. A gas generant filter assembly in accordance with one preferred embodiment of the invention includes a tubular wall portion. The tubular wall portion includes a sleeve member and has a central opening adapted to at least in part contain a supply of gas generant material reactable to produce reaction products including a quantity of gas. The tubular wall portion is constructed at least in part by a material effective in treating reaction products produced upon reaction of the gas generant material. The central opening has opposed first and second ends. The gas generant filter assembly also includes a closure disposed within the central opening at the second end of the central opening. The closure is effective to prevent passage through the second end of gas generant material contained within the central opening. The sleeve member is shapeable to form a plurality of retention tabs effective to secure the closure within the central opening at the second end.

The prior art generally fails to provide a gas generant filter assembly, such as used in an airbag inflator device of an inflatable restraint system, and which gas generant filter assembly desirably avoids or minimizes the requirement for additional component parts and/or otherwise reduces or minimizes one or more of the cost, weight and complexity of assembly to the extent required or otherwise desired for particular application and preferably without detrimentally impacting either or both performance and operation.

The invention further comprehends a combination which includes a cylindrical filter assembly, a closure and a quantity of gas generant material. In accordance with one preferred embodiment, the cylindrical filter assembly has a central opening with opposed first and second ends. Further, the closure is disposed at the second end of the cylindrical filter assembly and the quantity of gas generant material is contained within the cylindrical filter assembly, in the central opening thereof. Still further, in the combination:

the first end of the central opening is adapted to receive an initiator effective upon actuation to initiate reaction of at least a portion of the quantity of the gas generant material to produce gaseous reaction products;

the closure is effective to prevent passage of the gas generant material through the second end of the central opening and the filter assembly includes a plurality of layers including an inner layer forming a sleeve member shapeable to form a plurality of retention tabs effective to secure the closure within the central opening at the second end.

The invention still further comprehends, in accordance with another preferred embodiment of the invention, a specified airbag inflator. The airbag inflator includes an inflator housing, a gas generant-containing filter assembly combination unit and an initiator. More specifically, the inflator housing forms a combustion chamber. The gas generant-containing filter assembly combination unit is disposed within the combustion chamber. The gas generant-containing filter assembly combination unit includes a cylindrical filter assembly having a central opening with opposed first and second ends. The gas generant-containing filter assembly combination unit also includes a quantity of gas generant material contained within the filter assembly, in the central opening thereof. The gas generant material is reactable to produce gaseous reaction products. The closure is disposed within the central opening at the second end of the central opening. The closure is effective to prevent passage of gas generant material through the second end.

Other objects and advantages will be apparent to those skilled in the art from the following detailed description taken in conjunction with the appended claims and drawings.

BRIEF DESCRIPTION OF THE DRAWINGS

FIG. 5 is a simplified cross sectional view of the filter assembly and gas generant combination shown in FIG. 4.

FIG. 6 is a simplified top plan view of a filter assembly in accordance with one embodiment of the invention and in a pre-installation state.

FIG. 7 is a cross sectional view of the filter assembly shown in FIG. 6 and taken substantially along line 7—7.

DETAILED DESCRIPTION OF THE INVENTION

The present invention provides an improved gas generant filter assembly and related combinations, including airbag inflator devices.

Figure 1:
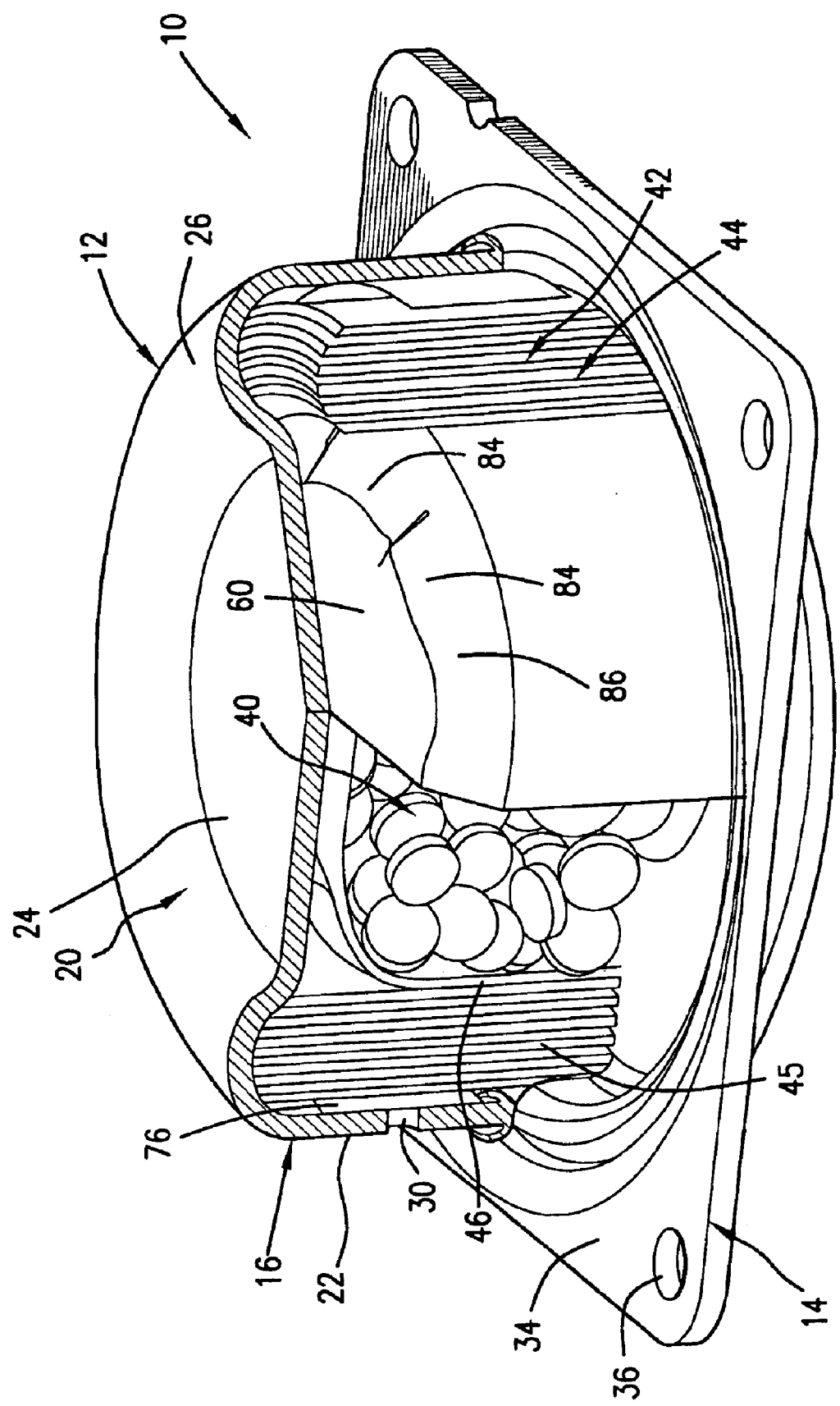
FIG. 1 is a simplified, partially in section perspective view of an inflator device in accordance with one embodiment of the invention.
Figure 2:
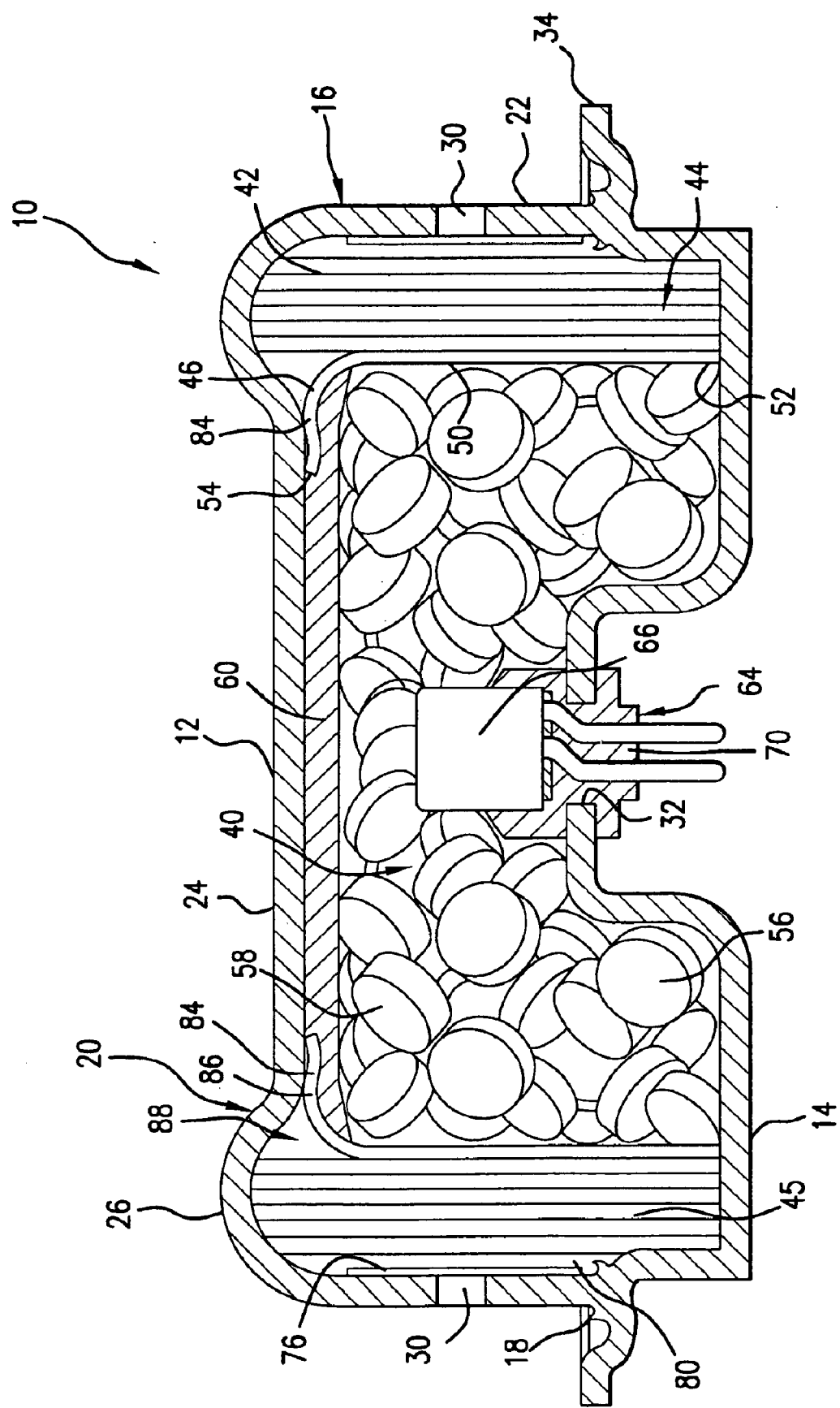
FIG. 2 is a cross sectional view of an inflator device generally corresponding to the inflator device shown in FIG. 1.

FIGS. 1 and 2 illustrate an inflator assembly or device in accordance with a one embodiment of the invention and generally designated with the reference numeral 10. The inflator assembly 10 has a generally cylindrical external outline and includes a housing construction 12 such as formed of two structural components, i.e., a lower shell or base portion 14 and an upper shell or diffuser cap portion 16, such as may desirably be made of steel and appropriately joined or fastened together such as by application of an appropriate welding operation such as via an inertia weld 18, for example.

The invention will be described hereinafter with particular reference to an inflatable restraint system installation for the protection of a vehicle driver, particularly in the event of a vehicular frontal impact. Such an inflator device is sometimes hereinafter referred to as a "driver inflator" device or the like. It will be understood, however, that inflator assemblies in accordance with the invention can, if desired, be applied in other applications including, for example, the inflation of an airbag cushion to protect a vehicle occupant other than the driver, such as a front seat passenger, for example. It is to be further understood and appreciated that the invention has general applicability to inflatable restraint installations for various automotive vehicles including vans, pick-up trucks, and particularly automobiles.

The diffuser cap portion 16 is in the general form of an inverted bowl and includes a top wall 20 and a cylindrical sidewall 22. In accordance with a preferred embodiment of the invention and as shown, the top wall 20 includes a sunken central portion 24 and a surrounding raised toroidal portion 26 such as desirably formed in a single continuous piece with the cylindrical sidewall 22. The sidewall 22 includes a plurality of spaced, preferably, generally spaced apart gas exit ports 30. Those skilled in the art and guided by the teachings herein provided will appreciate that the placement, positioning and sizing of the gas exit ports 30 can desirably be selected to provide or satisfy particular inflator performance criteria, such as in a manner known in the art.

The base portion 14 includes a mounting opening, designated by the reference numeral 32, the use of which will be discussed in greater detail below. The base portion 14 also includes a peripheral flange bracket 34 that extends radially outward from the housing 12 and serves to form an interface attachment which is used to attach the inflator assembly 10 to a vehicle the occupants of which are to be protected from injury tending to result from the impact of a collision. As shown in FIG. 1, the attachment bracket 34 is generally square or rectangular in outline and includes a selected number of attachment openings 36 for passage of a selected fastener (not shown), e.g., a rivet or bolt, to permit the attachment or joinder of the inflator assembly 10 with a corresponding portion of the vehicle. As will be appreciated, attachment brackets used in the practice of the invention can be variously shaped and sized dependent upon the particulars of the specific installation application. Further, it is to be understood that while the invention has been here described making reference to the incorporation and use of such an attachment bracket to permit the attachment or joinder of the inflator assembly 10 with a corresponding portion of the vehicle, the broader practice of the invention is not necessarily so limited. For example, an inflator assembly in accordance with the invention can be joined or attached within a module or the like using additional or alternative attachment devices or techniques, such as known in the art.

The housing 12 is configured to define a central, generally cylindrical chamber 40, sometimes hereinafter referred to as a "combustion chamber." The chamber 40 houses or contains an inflation gas-permeable treatment element, hereinafter generally referred to as a gas generant filter assembly, generally designated by the reference numeral 42. The gas generant filter assembly 42 includes a tubular wall portion 44 such as of generally cylindrical form and constructed at least in part by a material effective in treating reaction products produced upon reaction of the gas generant material. The tubular wall portion 44 can desirably be composed of an outer filter portion 45 and an inner sleeve member 46. For example, such tubular wall portion can desirably be constructed or formed of multiple layers or wraps of a metal, e.g., steel, screen or filter. Metal filter materials used in particular preferred embodiments of the invention include filter materials composed of one or more of meshed or weaved metal, knitted metal and expanded metal. In general, inflation gas-permeable treatment elements useful in the practice of the invention desirably perform one or more functions or operations such as the cooling, flow redirection or filtering, e.g., particulate removal, of or from a contacting stream, e.g., inflation gas generated or produced within the combustion chamber 40.

As will be appreciated by those skilled in the art and guided by the teachings herein provided, the sleeve member 46 can be formed or constructed as a separate piece or component from the outer filter portion 45 or, as shown and as generally preferred, the sleeve member 46 can be integral (i.e., formed continuous with and in one piece) with such outer filter portion 45. Further, while the broader practice of the invention is not necessarily limited to gas generant filter assemblies wherein the tubular wall portion is formed or constructed of multiple layers or wraps of a filter material, in accordance with one preferred embodiment of the invention it has been generally found desirable to employ a gas generant filter assembly which includes a tubular wall portion composed of about 6 to about 10 layers or wraps of about 0.4 mm to about 0.7 mm thick steel mesh screen such that the total tubular wall portion has a thickness in the range of about 5 mm to about 10 mm. For example, in accordance with one preferred embodiment of the invention, the tubular wall portion of a gas generant filter assembly of the invention is desirably formed of a one-piece web of filter material spirally wound to form the plurality of layers.

The tubular wall portion 44 has a central opening 50 having opposed first and second ends, 52 and 54, respectively. In accordance with a preferred practice of the invention, the central opening 50 is desirably adapted to at least in part contain a supply of gas generant material 56 such as known for use in airbag inflators, such as a pyrotechnic material composed of a transition metal ammine nitrate with oxidizer and binder, for example. In the inflator assembly 10, the gas generant material 56 is present in the form of tablets 58 and is generally reactable to produce reaction products including a quantity of gas such as may be used in the inflation of an associated inflatable airbag cushion (not shown).

The gas generant filter assembly 42 also includes a closure 60 generally disposed within the central opening 50 at the second end 54 thereof. In general, the closure 60 serves and is effective to prevent passage of the gas generant material 56 through the central opening second end 54. As will be appreciated by those skilled in the art and guided by the teachings herein provided, closures of various forms or constructions can desirably be used in the practice of the invention. For example, in accordance with one preferred embodiment of the invention, the closure is desirably in the form of a damper or isolation pad member. A closure of such form may be desired to reduce or minimize undesired contact and resulting noise by or between component parts of the inflator assembly 10, commonly referred to as "rattle," while such a vehicle-installed inflator assembly stands ready in the event of an occurrence of an event where activation of the assembly and inflation of an associated inflatable airbag cushion is desired or required. Further, in accordance with at least certain preferred embodiments of the invention, the incorporation and use of an isolation pad member closure can also desirably serve to isolate or otherwise insulate the gas generant material 56 from exterior heat and thus avoid undesired reaction or degradation of the gas generant material, for example.

An initiator assembly, generally designated by the reference numeral 64, is mounted to the housing 12 via the previously-identified mounting opening 32. The initiator assembly 64 includes an initiator 66, such as known in the art for use in inflatable restraint gas generation, and such as commonly includes a squib and an associated charge of a pyrotechnic igniter material. The initiator assembly 64 also includes a holder 70 whereby the initiator 66 is mounted to or is mated with the housing 12. While not shown, it will be appreciated that the initiator assembly may additionally include or contain one or more additional elements such as one or more squib seals or the like, such as known in the art, such as to better or more securely seal the initiator 66.

An adhesive-backed foil seal 76 is disposed generally adjacent the inner surface of the sidewall 22. The foil seal 76 preferably hermetically seals the gas generant material 56 within the inflator 10, thereby protecting the gas generant material 56 from various possibly harmful ambient conditions, such as including moisture. As will be appreciated, the need or desire to provide adequate surface area along the inner surface of the sidewall 22 such as to permit and facilitate attachment of the foil seal 76 thereto can serve as a practical or manufacturing limitation on the spacing of the gas exit ports 30. Those skilled in the art and guided by the teachings herein provided will appreciate that while the invention has been described above with reference to the inclusion of an adhesive-backed foil seal 76, the invention can, if desired, be practiced employing other suitable means or techniques to desirably seal the gas generant material within the inflator.

In accordance with a preferred embodiment of the invention and as perhaps best seen by reference to FIG. 2, a plenum 80 is provided between the inner surface of the sidewall 22 and the gas generant filter assembly tubular wall portion 44. The plenum 80 provides or serves as a volume of space or as a zone where the inflation gas can pass such that when the pressure within the plenum 80 becomes sufficiently elevated, such as to achieve a predetermined level, the foil seal 76 will rupture and permit gas to pass through the gas exit ports 30. The presence of the plenum 80 facilitates a more uniform distribution of the inflation gas within the inflator assembly 10 and access to the gas exit ports 30. Further, the presence of the plenum 80 can help minimize or avoid undesired contact by or between the filter assembly 42 and the inner surface of the diffuser cap portion cylindrical sidewall 22 and such as can otherwise result in undesirable fragmentation or other form of damage to the filter assembly 42, such as during the joining or connecting together of the base portion 14 and the diffuser cap portion 16, for example.

In accordance with a preferred practice of the invention, the gas generant filter assembly sleeve member 46 is bendable, crimpable or otherwise shapeable to form a plurality of retention tabs 84 effective to secure the closure 60 within the central opening 50 at the second end 54. As shown and described in greater detail below, the retention tabs 84 can desirably be in the general form of a spring wave 86 or the like and such as may be formed by the bent, crimped or otherwise shaped end portion of the sleeve member 46. As identified above, the diffuser cap portion top wall 20 includes a sunken central portion 24 and, in accordance with a preferred embodiment of the invention, upon the joining together of the housing base and cap portions 14 and 16, respectively, such top wall sunken central portion 24 interacts with the retention tabs 84 such as to further bend, crimp or otherwise shape such retention tabs to finally secure the closure 60 within the central opening 50.

The raised toroidal portion 26 provides or results in an added volume, designated by the reference numeral 88. As shown, the inflator assembly 10 advantageously employs or utilizes the added volume 88 by extending the outer filter portion 45 thereinto. As will be appreciated by those skilled in the art and guided by the teachings herein provided, such an assembly construction permits the incorporation and use of a greater relative amount of filter material within the assembly such as may desirably result in increased or otherwise improved treatment of a contacting stream.

As will be appreciated, the inflator assembly 10 can advantageously be simply fabricated or manufactured. For example, in accordance with one preferred embodiment of the invention, the inflator assembly 10 can be fabricated or manufactured by placing the gas generant filter assembly tubular wall portion 44 into position in the lower shell or base portion 14 of a first subassembly composed of the base portion 14 with the initiator assembly 64 appropriately joined or connected thereto to form an intermediary assembly. An appropriate and selected amount of the gas generant material 56 is then placed within the central opening 50. The closure 60 is applied and the sleeve member 46 appropriately crimped to secure the closure in place. Then, a second subassembly composed of the diffuser cap portion 16 with the foil seal 76 appropriately joined or connected thereto is applied to the gas generant-containing intermediary assembly and joined or connected such as by a welding operation.

Further, operation of such an inflation assembly desirably occurs or proceeds in a simple and straightforward manner. For example, such as upon the sensing of a collision, an electrical signal is sent to the initiator 66. The initiator 66 functions to initiate reaction of at least a portion of the quantity of the gas generant material 56 to produce gaseous reaction products and increase the pressure within the combustion chamber 40. With such reaction and increase in combustion chamber pressure, gaseous reaction products begin to pass through the inflation gas-permeable filter assembly 42 by first passing through the tubular wall sleeve member 46 and then through the outer filter portion 45. The pressure increase within the housing 12 will result in the subsequent predetermined rupturing or opening of the foil seal 76 and passage of the inflation gas through the gas exit ports 30 and out from the inflator assembly 10 into an associated airbag cushion (not shown).

While the invention has been described above with reference to a gas generant-containing inflator assembly wherein the gas generant is generally stored or contained herein in the form of tablets, it will be appreciated that the broader practice of the invention is not necessarily so limited. For example, inflator assemblies in accordance with other preferred embodiments of the invention desirably contain a supply of gas generant material which, in a pre-activation state, is present in the form of wafers.

Figure 3:
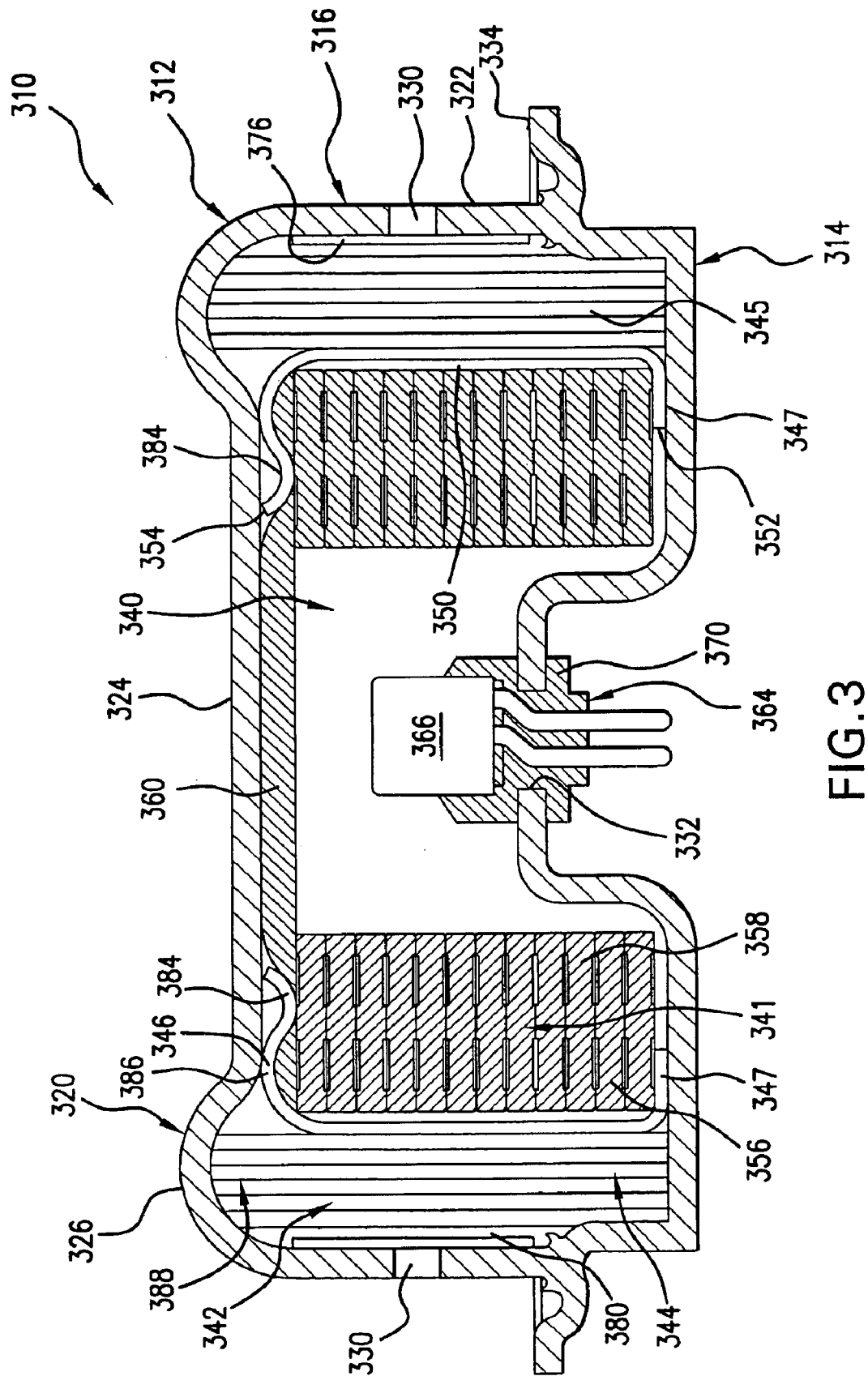
FIG. 3 is a cross sectional view of an inflator device in accordance with another embodiment of the invention.

FIG. 3 illustrates one such inflator assembly, generally designated by the reference numeral 310. The inflator assembly 310 is generally similar to the inflator assembly 10, described above. In particular, the inflator assembly 310 has a generally cylindrical external outline and includes a housing construction 312 such as formed of two structural components, i.e., a lower shell or base portion 314 and an upper shell or diffuser cap portion 316, such as described above.

The diffuser cap portion 316 is in the general form of an inverted bowl and includes a top wall 320 and a cylindrical sidewall 322. The top wall 320 includes a sunken central portion 324 and a surrounding raised toroidal portion 326 such as desirably formed in a single continuous piece with the cylindrical sidewall 322. The sidewall 322 includes a plurality of spaced, preferably, generally spaced apart gas exit ports 330.

The base portion 314 includes a mounting opening 332. The base portion 314 also includes a peripheral bracket 334 that extends radially outward from the housing 312 and serves to form an interface attachment which is used to attach the inflator assembly 310 to a vehicle the occupants of which are to be protected from injury tending to result from the impact of a collision.

The housing 312 is configured to define a central, generally cylindrical chamber 340, sometimes hereinafter referred to as a "combustion chamber." A gas generant-containing filter assembly combination, generally designated by the reference numeral 341, is disposed within the combustion chamber 340.

Now, also making reference to FIGS. 4–7, the gas generant-containing filter assembly combination 341 includes an inflation gas-permeable treatment element, hereinafter generally referred to as a gas generant filter assembly, generally designated by the reference numeral 342, similar to the gas generant filter assembly 42 described above. The gas generant filter assembly 342 includes a tubular wall portion 344 such as of a generally cylindrical form. The tubular wall portion 344 is desirably composed of an outer filter portion 345 and an inner sleeve member 346.

The sleeve member 346, though similar to the sleeve member 46 described above, additionally comprises or forms a retention flange, designated by the reference numeral 347, at the base end 348 thereof and such as may be desired to facilitate gas generant containment therewithin. The retention flange 347 can be simply formed by appropriately bending the sleeve member base end 348. While retention flanges of various construction can be employed in the practice of the invention, in accordance with one preferred embodiment of the invention wherein a metal strand weave is used to form the sleeve member 346, it has been found desirable to remove or otherwise eliminate weave cross strands in or in the vicinity of the retention flange 347 such as to minimize or avoid undesired overlapping of the sleeve member weave material at the base end 348.

The tubular wall portion 344 has a central opening 350 having opposed first and second ends, 352 and 354, respectively. In accordance with a preferred practice of the invention, the central opening 350 is desirably adapted to at least in part contain a supply of gas generant material 356 such as known for use in airbag inflators. In the inflator assembly 310, the gas generant material 356 is present in the form of a plurality of stacked or layered wafers 358. The gas generant material 356 is generally reactable to produce reaction products including a quantity of gas such as may be used in the inflation of an associated inflatable airbag cushion (not shown).

The gas generant filter assembly 342 includes a closure 360 generally disposed within the central opening 350 at the second end 354 thereof. In general, the closure 360 serves and is effective to prevent passage of the gas generant material 356 through the central opening second end 354.

It will be appreciated that in accordance with certain preferred embodiments of the invention, the gas generant-containing filter assembly combinations used in the practice of the invention can desirably form a subassembly or unit insertable in a gas generating device. For example, the gas generant-containing filter assembly combination 341, wherein the gas generant material 356 is present in the form of a plurality of stacked or layered wafers 358, can be inserted or employed within the inflator assembly 10 as a unit, if desired. As will be appreciated, the incorporation and use of such units can significantly facilitate, simplify or reduce the costs associated with assembly construction or manufacture.

Returning to FIG. 3, the inflator assembly 310 also includes an initiator assembly, generally designated by the reference numeral 364. The initiator assembly 364 is mounted to the housing 312 via the previously-identified mounting opening 332. The initiator assembly 364 includes an initiator 366, such as known in the art for use in inflatable restraint gas generation. The initiator assembly 364 also includes a holder 370 whereby the initiator 366 is mounted to or is mated with the housing 312.

A seal member such as in the form of an adhesive-backed foil seal 376 is disposed within the inflator assembly 310 such as to preferably hermetically seal the gas generant material 356 within the inflator 310, thereby protecting the gas generant material 356 from various possibly harmful ambient conditions, such as including moisture. In accordance with the illustrated embodiment, the adhesive-backed foil seal 376 is disposed generally adjacent the inner surface of the sidewall 322.

Similar to the inflator assembly 10, a plenum 380, such as described above, is provided between the inner surface of the sidewall 322 and the gas generant filter assembly tubular wall portion 344 in the inflator assembly 310.

Figure 4:
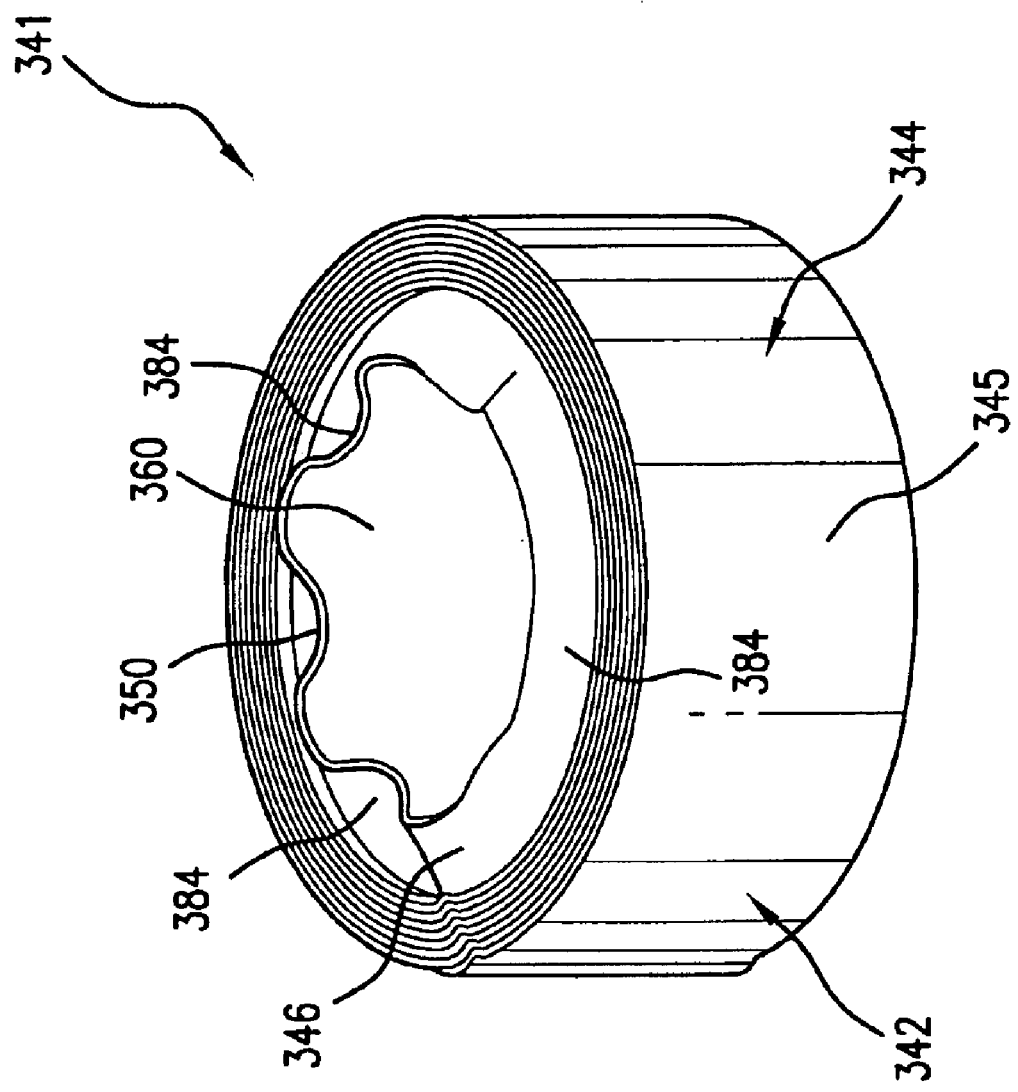
FIG. 4 is a simplified perspective view of the filter assembly and gas generant combination of the inflator device shown in FIG. 3, with such filter assembly and gas generant combination shown in isolation and prior to placement within the inflator device.

As perhaps best seen by reference to FIGS. 4 and 5, the gas generant filter assembly sleeve member 346 is, as described above relative to the sleeve member 46, bendable, crimpable or otherwise shapeable to form a plurality of retention tabs 384 effective to secure the closure 360 within the central opening 350 at the second end 354. As identified above, the retention tabs 384 can desirably be in the general form of a spring wave 386 formed by the bent, crimped or otherwise shaped end portion of the sleeve member 346. Further, the diffuser cap portion top wall 320 includes a sunken central portion 324 and, in accordance with a preferred embodiment of the invention, upon the joining together of the housing base and cap portions 314 and 316, respectively, such top wall sunken central portion 324 interacts with the retention tabs 384 such as to further bend, crimp or otherwise shape such retention tabs to finally secure the closure 360 within the central opening 350, as shown in FIG. 3.

As in the above-described embodiment, the raised toroidal portion 326 provides or results in an added volume, designated by the reference numeral 388, within the combustion chamber 340. As shown, the added volume 388 can be advantageously employed or utilized by extending the outer filter portion 345 thereinto such as to permit the incorporation and use of a greater relative amount of filter material within the assembly such as may desirably result in increased or otherwise improved treatment of a contacting stream.

The inflator assembly 310 can also advantageously be simply fabricated or manufactured. For example, in accordance with one preferred embodiment of the invention, the inflator assembly 310 can be fabricated or manufactured in a process employing three simple subassemblies:

subassembly 1—the base portion 314 with the initiator assembly 364 appropriately joined or connected thereto, subassembly 2—gas generant-containing filter assembly combination unit, and subassembly 3—the diffuser cap portion 16 with the foil seal 76 appropriately joined or connected thereto.

Thus, the inflator assembly 310 can be fabricated or manufactured by simply installing the gas generant-containing filter assembly combination unit subassembly into the base portion 314 and initiator assembly 364 subassembly to form an intermediary assembly. Followed by appropriately joining or connecting the diffuser cap portion 16 and foil seal 76 subassembly to the intermediary assembly such as by a welding operation.

Further, operation of such an inflation assembly desirably occurs or proceeds in a simple and straightforward manner. For example, such as upon the sensing of a collision, an electrical signal is sent to the initiator 366. The initiator 366 functions to initiate reaction of at least a portion of the quantity of the gas generant material 356 to produce gaseous reaction products and increase the pressure within the combustion chamber 340. With such reaction and increase in combustion chamber pressure, gaseous reaction products begin to pass through the inflation gas-permeable filter assembly 342 by first passing through the tubular wall sleeve member 346 and then through the outer filter portion 345. The pressure increase within the housing 312 will result in the subsequent predetermined rupturing or opening of the foil seal 376 and passage of the inflation gas through the gas exit ports 330 and out from the inflator assembly 310 into an associated airbag cushion (not shown).

Figure 8:
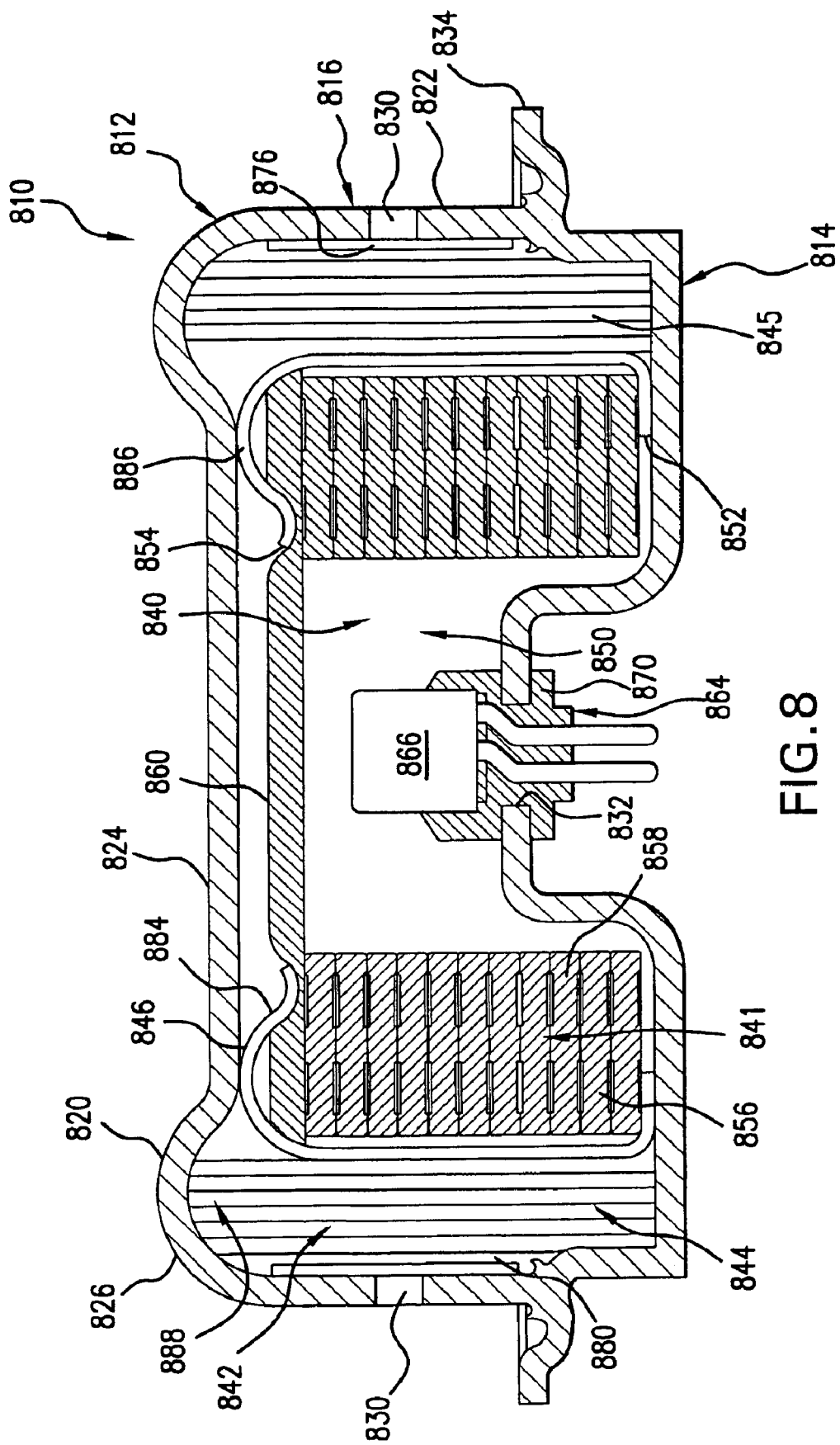
FIG. 8 is a cross sectional view of an inflator device in accordance with an alternative embodiment of the invention.

A desirable feature of at least certain preferred embodiments of the invention is the ease with which such inflator devices and, in particular, gas generant filter assemblies can be adapted to house or contain a different selected quantity or amount of gas generant material such as to permit same sized and shaped inflator assembly components to be used in inflators having different specifically designed inflation gas outputs. For example, FIG. 8 illustrates an inflator assembly, generally designated by the reference numeral 810, generally similar to the inflator assembly 310, but now containing a different selected quantity or amount of gas generant material.

The inflator assembly 810 is generally similar to the inflator assembly 310 and includes a housing construction 812 formed of a lower shell or base portion 814 and an upper shell or diffuser cap portion 816, such as described above. The diffuser cap portion 816 is in the general form of an inverted bowl and includes a top wall 820 and a cylindrical sidewall 822. The top wall 820 includes a sunken central portion 824 and a surrounding raised toroidal portion 826 such as desirably formed in a single continuous piece with the cylindrical sidewall 822. The sidewall 822 includes a plurality of spaced, preferably, generally spaced apart gas exit ports 830.

The base portion 814 includes a mounting opening 832. The base portion 814 also includes a peripheral bracket 834 that extends radially outward from the housing 812 and serves to form an interface attachment which is used to attach the inflator assembly 810 to a vehicle the occupants of which are to be protected from injury tending to result from the impact of a collision.

The housing 812 is configured to define a central, generally cylindrical combustion chamber 840. A gas generant-containing filter assembly combination 841 is disposed within the combustion chamber 840. The gas generant-containing filter assembly combination 841 includes a gas generant filter assembly, generally designated by the reference numeral 842. The gas generant filter assembly 842 includes a tubular wall portion 844 such as of generally cylindrical form. The tubular wall portion 844 is desirably composed of an outer filter portion 845 and an inner sleeve member 846. The tubular wall portion 844 has a central opening 850 having opposed first and second ends, 852 and 854, respectively. The central opening 850 is adapted to at least in part contain a supply of gas generant material 856 such as in the form of a plurality of stacked or layered wafers 858. The gas generant material 856 is generally reactable to produce reaction products including a quantity of gas such as may be used in the inflation of an associated inflatable airbag cushion (not shown). However, whereas the inflator assembly 310 contained twelve (12) gas generant wafers 358, the inflator assembly 810 contains a total of eleven (11) gas generant wafers 858.

As with the gas generant filter assembly 342 of the inflator assembly 310, the gas generant filter assembly 842 of the inflator assembly 810 also includes a closure 860 generally disposed within the central opening 850 at the second end 854 thereof, an initiator assembly 864 including an initiator 866 and a holder 870 whereby the initiator 866 is mounted to or is mated with the housing 812.

A seal member such as in the form of an adhesive-backed foil seal 876 is disposed within the inflator assembly 810 such as to preferably hermetically seal the gas generant material 856 within the inflator 810, thereby protecting the gas generant material 856 from various possibly harmful ambient conditions, such as including moisture. In accordance with the illustrated embodiment, the adhesive-backed foil seal 876 is disposed generally adjacent the inner surface of the sidewall 822.

As in the above-described embodiments, a plenum 880 is provided between the inner surface of the sidewall 822 and the gas generant filter assembly tubular wall portion 844.

The gas generant filter assembly sleeve member 846 is shapeable to form a plurality of retention tabs 884 effective to secure the closure 860 within the central opening 850 at the second end 854. As identified above, the retention tabs 884 can desirably be in the general form of a wave 886 formed by the bent, crimped or otherwise shaped end portion of the sleeve member 846. Further, the diffuser cap portion top wall 820 includes a sunken central portion 824 and, in accordance with a preferred embodiment of the invention, upon the joining together of the housing base and cap portions 814 and 816, respectively, such top wall sunken central portion 824 interacts with the retention tabs 884 such as to further bend, crimp or otherwise shape such retention tabs to finally secure the closure 860 within the central opening 850.

As in the above-described embodiments, the raised toroidal portion 826 provides or results in an added volume, designated by the reference numeral 888, within the combustion chamber 840. As shown, the added volume 888 can be advantageously employed or utilized by extending the outer filter portion 845 thereinto such as to permit the incorporation and use of a greater relative amount of filter material within the assembly such as may desirably result in increased or otherwise improved treatment of a contacting stream.

Both the fabrication and operation of the inflator assembly 810 is generally similar to that of the inflator assembly 310, described above.

The inflator assembly 810 highlights the capability of the of the shapeable gas generant filter assembly sleeve member 846 and, in particular the retention tabs 884 and retention wave 886 to serve or act as a tolerance or void space occupier within the inflation assembly 810 such as to permit a single designed inflation assembly to be employed over a range of desired inflation performance outputs while avoiding or minimizing undesired assembly rattle and the need for the inclusion of additional component parts such as in the form of a spacer or the like.

While the invention has been described above making specific reference to gas generant filter assemblies which include a tubular wall portion having a generally cylindrical form, those skilled in the art and guided by the teachings herein provided will appreciate that the broader practice of the invention is not necessarily so limited. In particular, the invention can be practiced with a gas generant filter assembly which includes a tubular wall portion having an other selected cross sectional shape. For example, the invention can be practiced employing a gas generant filter assembly which includes a tubular wall portion having an octagonal cross sectional shape. Further, if desired, the invention can be practiced employing a gas generant filter assembly which includes a tubular wall portion having one or more stiffening ribs such as may be desired or required to appropriately reinforce the filter assembly against the pressures which may be exerted thereagainst.

In view of the above it will be appreciated that the invention provides a gas generant filter assembly, such as used in an airbag inflator device of an inflatable restraint system, and which gas generant filter assembly desirably avoids or minimizes the requirement for additional component parts and/or otherwise reduces or minimizes one or more of the cost, weight and complexity of assembly to the extent required or otherwise desired for particular application and preferably without detrimentally impacting either or both performance and operation.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention.

We claim:

1. A gas generant filter assembly comprising:
   a tubular wall portion including a sleeve member and having a central opening to contain a supply of gas generant material reactable to produce reaction products including a quantity of gas, the tubular wall portion constructed at least in part of a material effective in treating reaction products produced upon reaction of the gas generant material, the central opening having opposed first and second ends, and
   a closure disposed within the central opening at the second end of the central opening, the closure effective to prevent passage through the second end of the central opening by the supply of gas generant material contained within the central opening,
   wherein the sleeve member is shapeable to form a plurality of retention tabs effective to secure the closure within the central opening at the second end.

2. The gas generant filter assembly of claim 1 wherein the tubular wall portion is cylindrical.

3. The gas generant filter assembly of claim 1 wherein the closure comprises a damper pad member.

4. The gas generant filter assembly of claim 1 wherein the tubular wall portion comprises a plurality of layers of filter material.

5. The gas generant filter assembly of claim 4 wherein the sleeve member is an inner layer of said plurality of layers of filter material.

6. The gas generant filter assembly of claim 5 wherein the tubular wall portion comprises a one-piece web of filter material spirally wound to form the plurality of layers.

7. The gas generant filter assembly of claim 1 wherein the tubular wall portion comprises a metal filter material.

8. The gas generant filter assembly of claim 7 wherein the metal filter material comprises a steel.

9. The gas generant filter assembly of claim 8 wherein the metal filter material comprises at least one form selected from the group consisting of a meshed metal, a knitted metal and an expanded metal.

10. A combination comprising:
the gas generant filter assembly of claim 1 and a quantity of gas generant material disposed in the central opening of the tubular wall portion,
wherein the tubular wall portion is effective to contain the quantity of gas generant material in the central opening thereof.

11. The combination of claim 10 wherein at least a portion of the quantity of gas generant material disposed in the central opening of the tubular wall portion comprises gas generant wafers.

12. The combination of claim 11 wherein the combination forms a unit insertable in a gas generating device.

13. An airbag inflator comprising the combination of claim 12.

14. The airbag inflator of claim 13 containing a supply of gas generant material consisting essentially of the quantity of gas generant material disposed in the central opening of the tubular wall portion.

15. The airbag inflator of claim 13 wherein the retention tabs are adjustable dependent on at least one factor selected from the group consisting of volume of the supply of gas generant material contained within the central opening and free volume within the inflator.

16. The combination of claim 10 wherein the combination forms a unit insertable in a gas generating device.

17. A combination comprising:
a cylindrical filter assembly having a central opening with opposed first and second ends;
a closure disposed at the second end of the cylindrical filter assembly; and
a quantity of gas generant material contained within the cylindrical filter assembly, in the central opening thereof,
wherein,
the first end of the central opening to receive an initiator effective upon actuation to initiate reaction of at least a portion of the quantity of the gas generant material to produce gaseous reaction products;
the closure effective to prevent passage of the gas generant material through the second end of the central opening; and
the filter assembly having a plurality of layers including an inner layer forming a sleeve member, the sleeve member shapeable to form a plurality of retention tabs effective to secure the closure within the central opening at the second end.

18. The combination of claim 17 wherein the closure comprises a damper pad member.

19. The combination of claim 17 wherein the filter assemble comprises a one-piece web of filter material spirally wound to form the plurality of layers.

20. The combination of claim 19 wherein the filter material comprises a metal.

21. The combination of claim 20 wherein the filter material metal comprises a steel.

22. The combination of claim 21 wherein the filter material metal comprises at least one form selected from the group consisting of a meshed metal, a knitted metal and an expanded metal.

23. The combination of claim 17 wherein the filter assembly comprises a one-piece web of a filter material spirally wound to form the plurality of layers.

24. The combination of claim 17 wherein the combination forms a unit insertable in a gas generating device.

25. An airbag inflator comprising the combination of claim 24.

26. The airbag inflator of claim 25 containing a supply of gas generant material consisting essentially of the quantity of gas generant material contained within the filter assembly.

27. An airbag inflator comprising the combination of claim 17 wherein at least a portion of the quantity of gas generant material contained in the central opening of the cylindrical filter assembly comprises gas generant wafers.

28. An airbag inflator comprising:
an inflator housing forming a combustion chamber,
a gas generant-containing filter assembly combination unit disposed within the combustion chamber, the gas generant-containing filter assembly combination unit including,
a cylindrical filter assembly having a central opening with opposed first and second ends,
a quantity of gas generant material contained within the filter assembly, in the central opening thereof, the gas generant material reactable to produce gaseous reaction products, and
a closure disposed within the central opening at the second end of the central opening, the closure effective to prevent passage of gas generant material through the second end, and
an initiator received in the first end, the initiator effective upon actuation to initiate reaction of at least a portion of the quantity of the gas generant material to produce gaseous reaction products,
wherein the filter assembly includes a sleeve member, the sleeve member shapeable to form a plurality of retention tabs effective to secure the closure within the central opening at the second end.

29. The airbag inflator of claim 28 wherein the closure comprises a damper pad member.

30. The airbag inflator of claim 28 wherein the filter assembly comprises a plurality of layers and wherein the sleeve member is an inner layer of said plurality of layers.

31. The airbag inflator of claim 30 wherein the filter assembly comprises a one-piece web of filter material spirally wound to form the plurality of layers.

32. An airbag inflator comprising:
an inflator housing forming a combustion chamber,
a gas generant-containing filter assembly combination unit disposed within the combustion chamber, the gas generant-containing filter assembly combination unit including,
a cylindrical filter assembly having a central opening with opposed first and second ends,
quantity of gas generant material contained within the filter assembly, in the central opening thereof, the gas generant material reactable to produce gaseous reaction products and
a closure disposed within the central opening at the second end of the central opening, the closure effective to prevent passage of gas generant material through the second end; and
an initiator received in the first end, the initiator effective upon actuation to initiate reaction of at least a portion of the quantity of the gas generant material to produce gaseous reaction products,
wherein the filter assembly comprises a plurality of layers of filter material.

33. The airbag inflator of claim 32 wherein the filter material comprises a metal having at least one form selected from the group consisting of a meshed metal, a knitted metal and an expanded metal.

34. The airbag inflator of claim 28 wherein the filter assembly comprises a plurality of layers of filter material.

35. The airbag inflator of claim 34 wherein the filter material comprises a metal having at least one form selected from the group consisting of a meshed metal, a knitted metal and an expanded metal.

36. The airbag inflator of claim 32 wherein the filter assembly is shapeable to retain the closure disposed within the central opening at the second end of the central opening.

* * * * *